H. C. MICHEL.
SEED PLANTING ATTACHMENT FOR CULTIVATORS.
APPLICATION FILED SEPT. 18, 1916.

1,259,033.

Patented Mar. 12, 1918.
2 SHEETS—SHEET 1.

Inventor
H. C. Michel

By Max A. Schmidt

Attorney

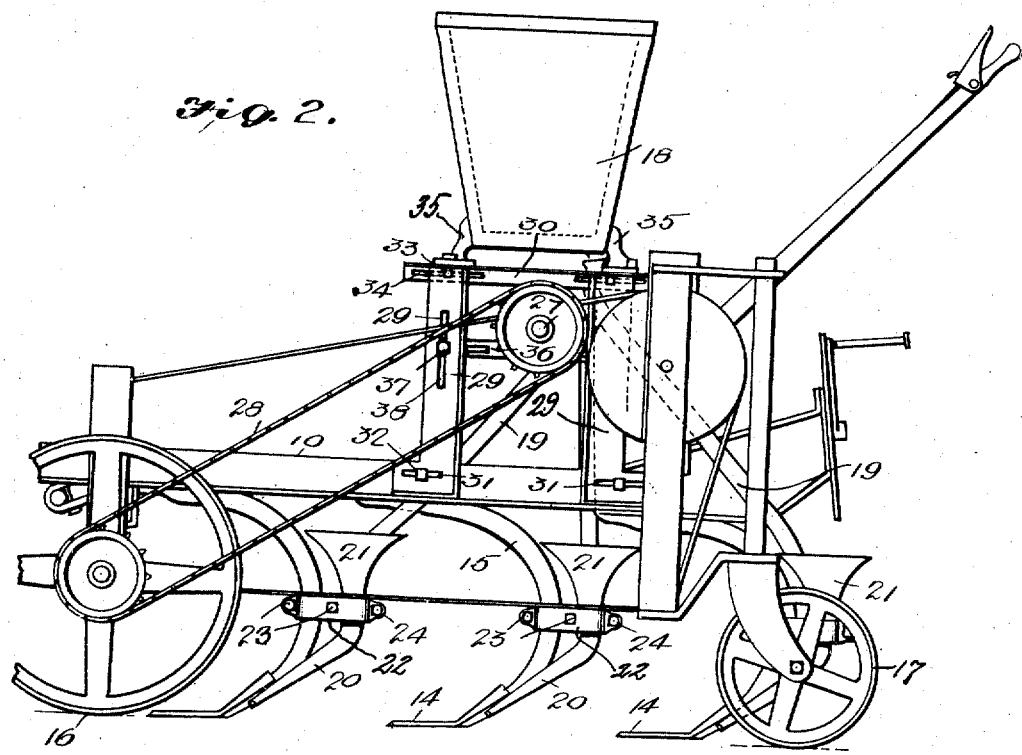

UNITED STATES PATENT OFFICE.

HERMAN C. MICHEL, OF DIXIE, WASHINGTON.

SEED-PLANTING ATTACHMENT FOR CULTIVATORS.

1,259,033.   Specification of Letters Patent.   Patented Mar. 12, 1918.

Application filed September 18, 1916. Serial No. 120,686.

*To all whom it may concern:*

Be it known that I, HERMAN C. MICHEL, a citizen of the United States, residing at Dixie, in the county of Walla Walla and State of Washington, have invented certain new and useful Improvements in Seed-Planting Attachments for Cultivators, of which the following is a specification.

This invention relates to improvements in seed planting attachments for cultivators, and its object is to provide a novel and improved mechanism which cultivates the soil, destroys all weeds, sows the grain, and covers the latter with a loose layer of soil, thus leaving the field well planted and clean.

The invention also has for its object to provide a novel and improved means for mounting the seed tubes or spouts which conduct the seed to the ground, said tubes being adjustable for a purpose to be hereinafter described.

In order that the invention may be better understood, reference is had to the accompanying drawings forming a part of this specification.

In the drawings—

Fig. 2 is a side elevation thereof, and

Figure 1:
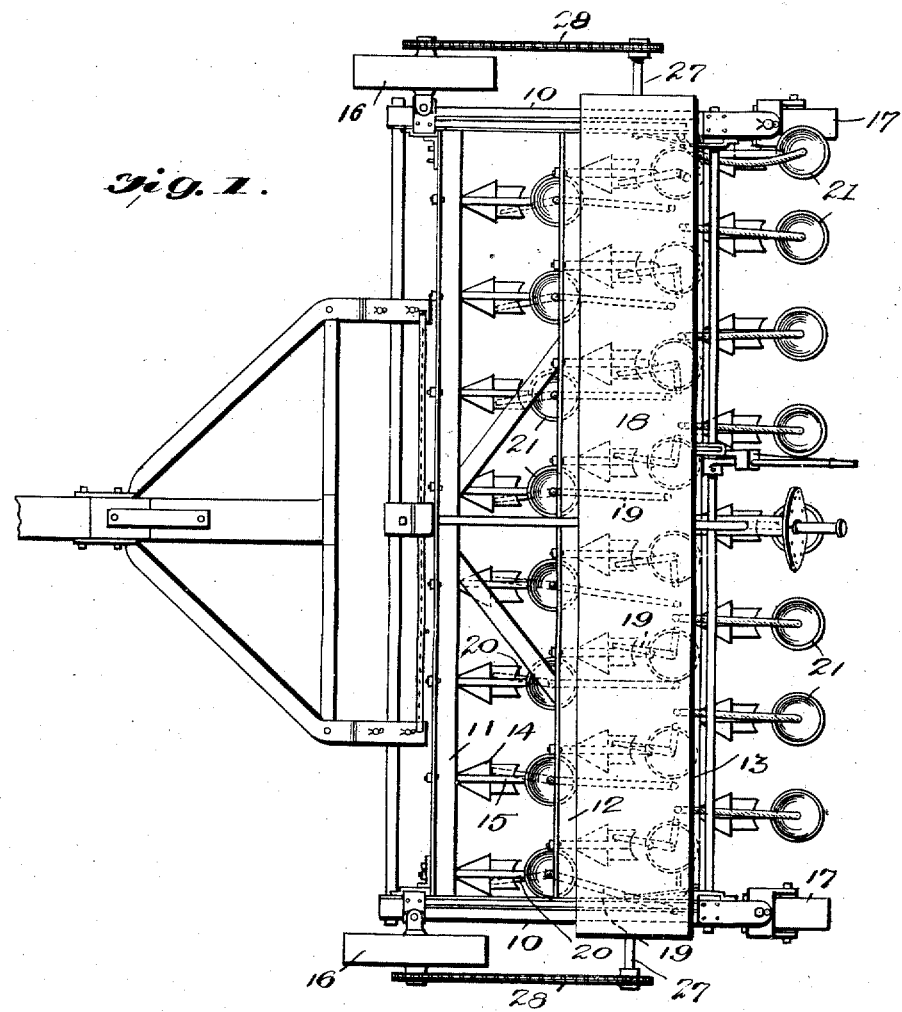
Figure 1 is a plan view of the machine.
Figure 3:
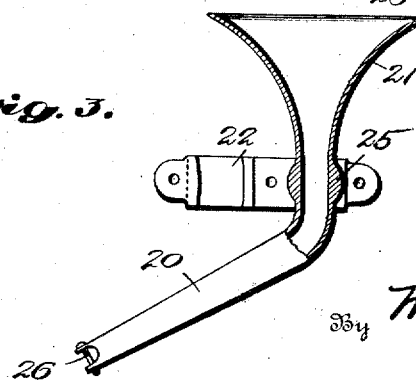
Fig. 3 is a side elevation, partly in section, of one of the seed-distributing tubes.

The invention is shown applied to the combined weeder and cultivator disclosed in Patent No. 1175003 dated March 14, 1916. The frame of this machine comprises laterally spaced, parallel side bars 10 connected by front, intermediate and rear cross bars 11, 12 and 13, respectively, supporting the earth working members, the latter being shovels 14 bolted or otherwise fastened to curved shanks or beams 15 made fast to the cross bars. The shovels are designed to cut weeds in the ground and to loosen the ground after the cutting.

The frame of the machine is supported at the front on wheels 16 and at the rear on wheels 17 in the same manner as the machine disclosed in the patent hereinbefore referred to, and it has the same means for elevating and lowering the frame.

The seeding attachment comprises the following parts:

Above the frame of the machine is supported a seed box 18 from which depend seed conducting tubes 19 which empty into seed distributing tubes 20, the latter tubes extending down to the ground to deposit the seed thereon. The upper ends of the tubes 20 are flared, or funnel-shaped as shown at 21, and the lower ends of the tubes 19 extend thereinto. The tubes 19 are connected to the seed box 18 in the ordinary manner, which is immaterial to the present invention, and need, therefore, not be illustrated.

The tubes 20 are carried by the cultivator shanks or beams 15. The attachment is made by a bracket composed of two opposite jaw members 22 placed on opposite sides of the cultivator shank and clamped thereto by bolts 23. The jaw members project rearward and horizontally from the shank, and the tube 20 is clamped between said projecting ends by drawing the same together by means of a transverse bolt 24. That portion of the tube which fits between the jaw members has a spherical shaped exterior 25, and the inner surfaces of the jaw members are shaped to form a socket in which the sphere seats, and below the jaw members the tube slants laterally. The tube is thus swivelingly supported to swing about a vertical axis, and it may be turned sidewise to properly position its lower outlet end with respect to a cultivator shovel, and upon tightening the bolt 24, the tube is securely held in adjusted position. The object of swiveling the seed tubes 20 is to provide a means whereby seed boxes 18 of various makes and with various spacings between the outlets thereof, may be readily attached to the machine, and the seed tubes distributed under the shovels 14 as nearly as possible in line with such outlets, and at the same time taking into consideration that the seed tubes should be supported by the most convenient shank 15. Each seed tube 20 is attached to a shank 15 which is nearest in line with the seed outlet of the box 18, and by the swiveling connection, the seed tube may be deflected to the right or left to obtain this alinement. In other words, the spacing of the seed tubes 20 should harmonize with the spacing of the seed outlets of the box 18, and as the spacing between the shovels 14 does not conform to the spacing of the seed outlets of the seed box, it will be seen that by the adjustable mounting of the seed tubes, it is made possible to obtain approximately the correct spacing between the seed tubes, the tubes being capable of adjustment to the right or left to the line of the seed box outlets, without losing their proper position with respect to the shovels 14. The tubes are attached to the most convenient beam or shank 15, and to give the rows a broadcast sowing effect, a transverse pin 26 is mounted at the mouth or outlet end of the tube, said pin tending to scatter the seed. The mouth of the tube is located back of the cultivator shovel 14 and it is therefore covered and prevented from becoming clogged with dirt. The machine is shown provided with three rows of cultivator shovels, set staggered and associated with certain ones in each row of shovels is a seed distributing tube. The number of tubes corresponds to the number of seed outlets of the box 18. As the machine has more cultivator shovels 14 than seed tubes, certain ones of the shovels are not provided with seed tubes. The arrangement of seed tubes is however such that the seed is distributed on the ground in equally spaced parallel rows back of the shovels, the latter loosening the soil and covering the seed.

The feed shaft 27 of the seeding attachment is driven from the front wheels 16 by a sprocket and chain gearing 28 at each end.

The following means are provided for securing the seed box 18 in place on the machine:

On each side bar 10 is mounted a pair of uprights 29 connected at the top by a cross bar 30. The side bars are angle bars, and the uprights are bolted to the upstanding flanges thereof, their base portions being widened and having longitudinal slots 31 through which the bolts 32 which fasten the uprights to the flanges pass. The fastening between the cross bar and the uprights is made by bolts 33, the cross bar having longitudinal slots 34 through which the bolts pass. The slots 31 and 34 permit the spacing of the upright to be varied according to the width of the seed box from front to rear. The seed box is fastened to the cross bars 30 by brackets 35. Below the cross bar, the uprights are connected by a cross bar 36 secured by bolts 37, the uprights having vertical slots 38 through which the bolts pass, said slots being for the purpose of permitting vertical adjustment of the cross bar.

I claim:

1. The combination with a cultivator shovel and its shank; of a seeding attachment comprising a seed-distributing tube carried by the shovel shank to distribute the seed behind the shovel carried by said shank, said tube being swivelingly supported by the shovel shank to swing about a vertical axis, and having a laterally slanting discharge end, a seed box, and a seed-conducting tube leading from the seed box outlet and discharging into the distributing tube.

2. A seeding attachment comprising a seed-distributing tube, and a support for the tube to which it is swiveled to swing about a vertical axis, the tube having a lateral slant below the support, and the support having opposite jaw members, means for clamping the tube between said jaw members in fixed position relative to the support, a seed box, and a seed-conducting tube leading from the seed box outlet and discharging into the distributing tube.

3. A seeding attachment comprising a seed-distributing tube, and a support for the tube to which it is swiveled intermediate its ends to swing about a vertical axis, the inlet end of the tube being above the support and the tube having a lateral slant below the support, the slant being at an oblique angle to said vertical axis, and means for clamping the tube in fixed position relative to the support.

In testimony whereof I affix my signature in the presence of two witnesses.

HERMAN C. MICHEL.

Witnesses:
E. E. SAUZE,
W. A. TONER.